United States Patent
Conard et al.

(10) Patent No.: US 8,152,358 B2
(45) Date of Patent: Apr. 10, 2012

(54) SYSTEM AND APPARATUS TO DELIVER LOW-INCLUSION FEED INGREDIENTS INTO LIVESTOCK RATION

(75) Inventors: Chad Allen Conard, Fort Calhoun, NE (US); Shalis Winder, Omaha, NE (US)

(73) Assignee: Cargill, Incorporated, Wayzata, MN (US)

( * ) Notice: Subject to any disclaimer, the term of this patent is extended or adjusted under 35 U.S.C. 154(b) by 706 days.

(21) Appl. No.: 12/313,206

(22) Filed: Nov. 18, 2008

(65) Prior Publication Data

US 2009/0238031 A1    Sep. 24, 2009

Related U.S. Application Data

(60) Provisional application No. 60/989,384, filed on Nov. 20, 2007.

(51) Int. Cl.
*B01F 15/02* (2006.01)
(52) U.S. Cl. .......... 366/141; 366/156.1; 366/162.2; 366/181.1; 366/319; 366/323; 366/601
(58) Field of Classification Search .......... 366/141, 366/156.1, 162.2, 181.1, 319, 323, 601
See application file for complete search history.

(56) References Cited

U.S. PATENT DOCUMENTS

| | | | | |
|---|---|---|---|---|
| 2,953,360 A | * | 9/1960 | Kline | 366/133 |
| 3,168,291 A | * | 2/1965 | Knoedler et al. | 366/142 |
| 3,437,075 A | | 4/1969 | Hawes, Jr. et al. | |
| 3,498,311 A | | 3/1970 | Hawes, Jr. et al. | |
| 3,580,548 A | * | 5/1971 | Moore | 366/156.1 |
| 3,670,923 A | | 6/1972 | Hawes, Jr. et al. | |
| 3,804,377 A | * | 4/1974 | Kugle et al. | 241/98 |
| 3,806,001 A | | 4/1974 | Pratt | |
| 3,822,056 A | * | 7/1974 | Hawes et al. | 366/114 |
| 4,353,902 A | | 10/1982 | Hedde et al. | |
| 4,382,966 A | | 5/1983 | Mickus et al. | |
| 4,500,558 A | | 2/1985 | Fulger et al. | |

(Continued)

FOREIGN PATENT DOCUMENTS

| | | |
|---|---|---|
| WO | WO 03-059087 | 7/2003 |
| WO | WO 2004-080197 | 9/2004 |

OTHER PUBLICATIONS

"Sweet Bran Consistent by Design (c)", article, 2005, Cargill (retrieved on Sep. 9, 2005); retrieved from the Internet: http://www.cargill.com/products.crop/ps_sweetbran_dairy.htm. 1 page.

(Continued)

*Primary Examiner* — Robert B Davis

(57) ABSTRACT

A system for delivering microingredient feed additives into a feed ration includes a storage hopper with a mixer element attached to an agitator shaft that is configured to agitate a high-moisture feed ingredient in the hopper when the agitator shaft is rotated. A micromachine includes storage containers for storing low-inclusion ingredients, and meters and dispenses precise amounts of selected low-inclusion ingredients without using a fluid carrier. A mixing conveyor receives and mixes the high-moisture feed ingredient and the selected low-inclusion ingredients. The mixing conveyor includes a discharge screw with a rotatable shaft and flighting attached to the shaft, wherein a portion of the flighting positioned below the storage hopper pull the high-moisture feed ingredient from the storage hopper and convey it to a mixing section that receives the selected low-inclusion ingredients dispensed from the micromachine without using a fluid carrier and mixes the low-inclusion ingredients with the feed ingredient.

20 Claims, 6 Drawing Sheets

U.S. PATENT DOCUMENTS

| | | | |
|---|---|---|---|
| 4,561,781 A * | 12/1985 | Seymour | 366/132 |
| 4,733,971 A | 3/1988 | Pratt | |
| 4,756,921 A | 7/1988 | Calandro et al. | |
| 4,765,747 A * | 8/1988 | High et al. | 366/186 |
| 4,777,045 A | 10/1988 | Vanderveer | |
| 4,815,042 A | 3/1989 | Pratt | |
| 4,837,112 A | 6/1989 | Calandro et al. | |
| 4,859,485 A | 8/1989 | Linton et al. | |
| 4,889,433 A | 12/1989 | Pratt | |
| 4,910,024 A | 3/1990 | Pratt | |
| 5,008,821 A | 4/1991 | Pratt | |
| 5,021,247 A | 6/1991 | Moore | |
| 5,052,874 A * | 10/1991 | Johanson | 414/326 |
| 5,087,864 A | 2/1992 | Abel | |
| 5,145,695 A | 9/1992 | Smith et al. | |
| 5,219,224 A | 6/1993 | Pratt | |
| 5,219,596 A | 6/1993 | Smith et al. | |
| 5,240,324 A * | 8/1993 | Phillips et al. | 366/132 |
| 5,340,211 A | 8/1994 | Pratt | |
| RE34,776 E | 11/1994 | Pratt | |
| 5,369,032 A | 11/1994 | Pratt | |
| 5,401,501 A | 3/1995 | Pratt | |
| 5,673,647 A | 10/1997 | Pratt | |
| 5,709,894 A | 1/1998 | Julien | |
| 5,783,238 A | 7/1998 | Julien | |
| 6,000,361 A | 12/1999 | Pratt | |
| 6,024,993 A | 2/2000 | Theuninck et al. | |
| 6,056,990 A | 5/2000 | Delrue et al. | |
| 6,068,873 A | 5/2000 | Delrue et al. | |
| 6,228,213 B1 | 5/2001 | Hanna et al. | |
| 6,318,289 B1 | 11/2001 | Pratt | |
| 6,383,547 B1 | 5/2002 | Delrue et al. | |
| 6,451,370 B1 | 9/2002 | Anderson | |
| 6,511,698 B1 | 1/2003 | Kloubec | |
| 6,516,746 B2 | 2/2003 | Pratt | |
| 6,779,486 B2 * | 8/2004 | Vaags | 119/51.11 |
| 6,805,075 B2 | 10/2004 | Pratt | |
| 6,805,897 B2 | 10/2004 | Rounds et al. | |
| 6,902,649 B1 | 6/2005 | Satyavolu et al. | |
| 7,052,712 B2 | 5/2006 | Huber et al. | |
| 7,427,411 B2 | 9/2008 | Ethington, Jr. | |
| 7,501,269 B2 | 3/2009 | Andela et al. | |
| 2003/0054085 A1 | 3/2003 | Anderson | |
| 2003/0082290 A1 | 5/2003 | Dull | |
| 2004/0194714 A1 * | 10/2004 | Lee | 119/54 |

OTHER PUBLICATIONS

McEllhiney, "Quality Control n Feed Manufacturing", article, May 1976, 25 pages.

Brenner & Rugg, "High Temperature Dilute Acid Hydrolysis of Waste Cellulose: Batch and Continuous Process", EPA Technical Report (Jul. 1986), 4 pages.

"MGA®; A Proven Performer", Pharmacia Animal Health, 2 pages.

"Optaflexx™ Fact Sheet", Elanco Animal Nutrition, 2003, 1 page.

A. Stephen Freeman, PHD., "TECHreport From QLF", University Trial on Liquid Supplement. 1 page.

"Dairy Beef Feedlot Finisher Plus", Land O Lakes Product No. 1733800, Apr. 2004, 2 pages.

Choice Cattle Feeding: "Recharge®; Regain1®; Regain5®; Regain 10®; 36 Beef®; Grow & Show®; Fiber Charge®; Gluten Balancer®; or Corn Distiller's Balancer®;" U.S. Feeds Choice Cattle Feeding pamphlet, 8 pages.

"AutoPilot4Feed Advanced Control for Feed Mills", DSL Systems, Comco Manufacturing Ltd. 6 pages.

"Quality Screw Conveyor Systems and Components," Screw Conveyor Corporation; Catalog # 991A, 1992; Hammond, Indiana. 12 pages.

H. Chester-Jones, "Beef Cattle Management Update", University of Minnesota Extension Service, Nov. 1994, 10 pages.

McCann et al., "Use of Alternate Feeds for Beef Cattle", [Online], [Retrieved on Sep. 9, 2005], Retrieved from: http://pubs.caes.uga.edu/caespubs/pubcd/1406-w.htm . 7 pages.

Amaral-Phillips et al., "Using Byproducts to Feed Dairy Cattle", Retrieved [online], [retrieved on Sep. 9, 2005]. Retrieved from: http://www.ca.uky.edu.agc/pubs/asc136/asc136.htm. 12 pages.

Kurt A. Rosentrater and Gregory D. Williams, "Design Considerations for the Construction and Operation of Feed Milling Facilities. Part II: Process Engineering Considerations", paper No. 044144, 2004 ASAE Annual meeting. 22 pages.

Fairchild, "Efficient Batching Systems", Grainnet, Oct. 1999, [Online], [Retrieved on Jun. 23, 2011], Retrieved from: http://www.grainnet.com/info/articles_print.html?ID=1275. 4 pages.

"Liquid batching systems", ChemIndustrial Systems, Inc., [Online], [Retrieved on Jun. 23, 2011], Retrieved from: http://www.liquidbatching.com/php/print.php. 2 pages.

Pritchard, "Bunk Management", South Dakota State University, [Online], [Retrieved on Jun. 23, 2011], Retrieved from: http://www.lolfeed.com/contents/beef/pdfs/bunkmanagement.HTM. 6 pages.

The Feed Mill, Burnet Center, Texas Tech University, Department of Animal and Food Sciences, Apr. 2008, [Online], [Retrieved on Jun. 23, 2011], Retrieved from: http://www.depts.ttu.edu/afs/burnett_center/feedmill.htm. 3 pages.

"The Batch Box, Feed Batching System by Feeding Systems, LLC", [Online], [Retrieved on Jun. 23, 2011], Retrieved from: http://www.feedingsystems.biz/. 1 page.

* cited by examiner

SYSTEM AND APPARATUS TO DELIVER LOW-INCLUSION FEED INGREDIENTS INTO LIVESTOCK RATION

CROSS-REFERENCE TO RELATED APPLICATIONS

This application claims the benefit of U.S. Provisional Application Ser. No. 60/989,384, filed Nov. 20, 2007, entitled SYSTEM AND APPARATUS TO DELIVER LOW-INCLUSION FEED INGREDIENTS INTO A LIVESTOCK RATION, which is hereby incorporated by reference in its entirety.

TECHNICAL FIELD

This disclosure relates to delivering low-inclusion feed ingredients into an animal feed ration.

BACKGROUND

It has long been a common practice to administer additives to supplement livestock feed rations. Feed additives can be used, for example, to help provide a balanced diet (e.g., vitamins and/or trace minerals), to protect the animals from disease or stress (e.g., antibiotics, probiotics), and/or to stimulate growth (e.g., hormones). Feed additives or supplements generally are administered to each animal or group of animals on a regular basis in carefully controlled dosages, oftentimes very small dosages, to ensure optimal benefit. Such additives generally are considered to be low-inclusion ingredients, which can be defined as ingredients found in amounts of less than 1 to 2 pounds (lbs) per ton of feed ration.

Currently the beef and dairy industries use one of two methods to deliver low-inclusion ingredients (e.g., microingredients and/or macroingredients) into the feed ration. For feed yards or dairies that have a complete feed mill with batch-mixing capability, a 'micromachine' (see, for example, U.S. Pat. Nos. 3,437,075; 3,498,311; 3,670,923; 3,806,001; 3,822,056; and 4,733,971) is used that weighs each of the low-inclusion ingredients and uses a fluid (e.g., compressed air or liquid, such as water) flush to deliver the microingredients to the batch mixing system. A liquid flush typically results in the addition of water in the amount of about 1-2% of the feed ration. Disadvantages of fluid flushes can include inadequate liquid mass to provide adequate mixing, freezing of the liquid during winter months, and increased risk of corrosion for transport equipment.

For producers without access to a micromachine, the low inclusion ingredients typically are provided as part of pre-made pellets that are added to a feed mixer or directly to the feed ration. See, for example, Land O Lakes Finisher Plus® pellets (Catalog No. 1733800) or Land O Lakes Finisher Plus R250 T90® pellets (Catalog No. 1733820). See, also, the Choice® cattle feeding program offered by U.S. Feeds, which provides nine different pellet formulations (e.g., Recharge®; Regain 1®; Regain 5®; Regain 10®; 36 Beef®; Grow & Show®; Fiber Charge®; Gluten Balancer®; or Corn Distiller's Balancer®). The disadvantages of pellets, however, include the bulky storage requirement, inflexibility because of limited and finite pre-made pellet ingredient combinations, the number of different pellets that a producer must keep on hand to accommodate and/or treat different populations of animals, and a possibility of non-uniform distribution throughout the ration.

SUMMARY

The present disclosure describes a system that maintains the substantially uniform distribution of low-inclusion ingredients in a feed ration without using pre-made pellets and without using a fluid carrier to deliver the low-inclusion ingredients to the feed ration.

The details of one or more implementations are set forth in the accompanying drawings and the description below. Other features, objects, and advantages will be apparent from the drawings and detailed description, and from the claims.

DESCRIPTION OF DRAWINGS

Like reference symbols in the various drawings indicate like elements.

DETAILED DESCRIPTION

The present disclosure describes systems, apparatuses and methods for making a feed ration. Specifically, the systems, apparatuses and methods disclosed herein allow for the uniform distribution of low-inclusion ingredients, or microingredients, in a feed ration, and also allow for the substantially uniform distribution of low-inclusion ingredients to be maintained in the ration. The systems, apparatuses and methods disclosed herein may deliver microingredient feed additives into a feed ration for animal consumption without using a fluid carrier for delivery of the microingredient feed additives. Specifically, the additives may be delivered to the ration without using a liquid carrier, such as water, and without using a compressed air carrier or any other fluid carrier. In addition to not using a fluid carrier to deliver low-inclusion ingredients to the ration, the systems, apparatuses and methods disclosed herein do not utilize pre-made pellets, according to an implementation. Maintaining the substantially uniform distribution of low-inclusion ingredients throughout the livestock feed ration may be desirable to ensure that all of the animals being fed the ration receive a correct or desired amount of each low-inclusion ingredient. This may prevent animals from receiving too much or too little of the low-inclusion ingredient, for example, which may lead to healthier and better-nourished animals.

Figure 1:
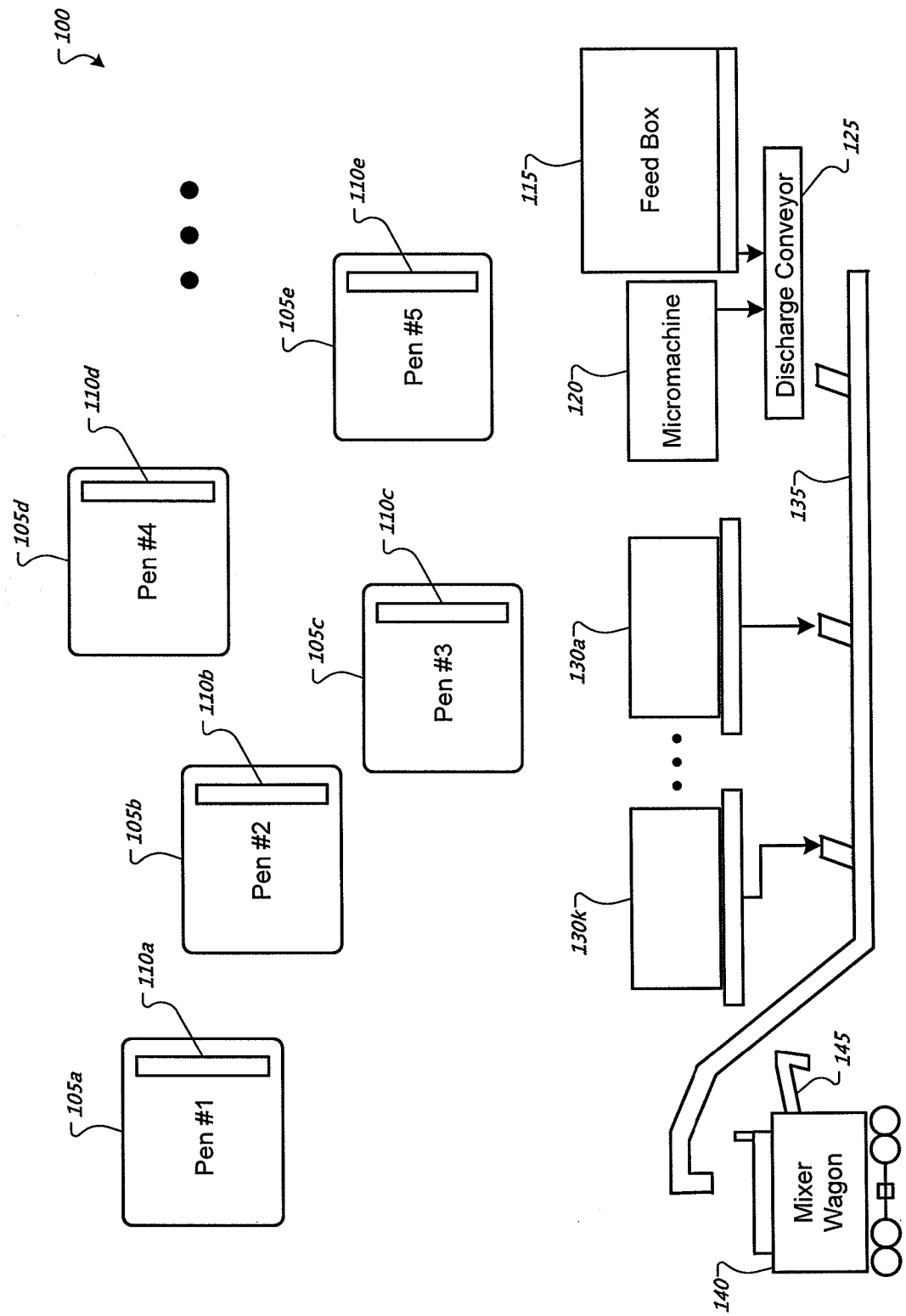
FIG. 1 is a diagram of a feed yard and an exemplary system for mixing a livestock feed ration.

FIG. 1 is diagram 100 of a feed yard and an exemplary system for mixing a livestock feed ration. FIG. 1 shows several exemplary livestock pens 105, each of which may house cattle or other livestock at a feed yard or on a farm, for example. Suppose in this example that pen #1 105*a* and pen #2 105*b* each contain male cattle, that pen #3 105*c* and pen #4 105*d* each contain female cattle, and that pen # 5 105*e* contains sick or diseased cattle. In an implementation, a farmer or feedlot operator may wish to prepare one or more batches of feed to feed the animals in the pens 105, where each batch may contain different feed ingredients or concentrations of feed ingredients, including different microingredients or different concentrations of microingredients. Depending on the implementation, each batch of prepared feed may be used to feed one, two, three, or more pens 105 of animals. For simplicity, FIG. 1 shows only five animal pens 105, but there could be any appropriate number of pens 105 in other implementations. For example, the feed lot may house up to 5,000-10,000 head of cattle, or more, and the animals may be housed in dozens or hundreds of pens 105, depending on the implementation. Of course, the animals could be sorted in any desirable fashion, such as by gender, age, weight, size, state of health, according to illness or disease, reproductive state, and the like.

In an implementation, animals may be housed in a particular pen 105 based on nutritional needs of the animal. For example, the male cattle housed in the first two pens 105a, 105b, in this example, may have different nutritional needs than the female cattle housed in the second two pens 105c, 105d. For this reason, the farmer or feedlot operator may use the system of FIG. 1 to mix different low-inclusion feed ingredients into each batch, or may vary concentrations of low-inclusion feed ingredients across batches. Similarly, the sick animals in pen #5 105e may have different nutritional needs than either the healthy male or healthy female cattle, and may additionally require antibiotics or other additives in their feed ration, for example. In some implementations, animals may be moved to different pens 105 as their dietary needs change, for example, and appropriate rations may be prepared using an appropriate selection and concentration of microingredients using the systems, apparatuses and methods described herein.

Within each pen 105, the animals may be fed in a feed bunk or trough 110, according to an implementation, as by delivering a batch of feed or a portion of a batch of feed to the feed bunk 110 in the pen 105. In some cases, the feed bunks 110 can be up to hundreds of feet long so as to simultaneously accommodate a large number of feeding animals, though any appropriate size bunk or trough 110 may be used. In one implementation, a feed bunk is approximately 75 feet long. In alternative arrangements, the feed may be delivered onto a feeding slab, such as a slab of concrete, onto the ground of the pen 105, or into other types of livestock feeders, such as bin feeders or hopper feeders with individual feeding stations.

It may be important that the batch is mixed uniformly, so that each of the animals in the pen 105 may benefit by getting an appropriate amount of low-inclusion feed ingredients in the ration, regardless of where along the trough 110 the animal feeds. Using the systems, apparatuses and methods disclosed herein, each pound of the ration in the batch may contain substantially uniform amounts of the microingredients, which may advantageously permit the animals to consume a desired quantity of low-inclusion feed ingredients as part of the ration.

Low-inclusion ingredients, or microingredients, are ingredients that are added to a feed ration in low to very low levels (e.g., less than 1 to 2 pounds per ton of feed ration). Low-inclusion ingredients can include, without limitation, ionophores, antibiotics (e.g., chlortetracycline, oxytetracycline, bacitrain, tylosin, aureomycin), probiotics and/or yeast cultures, vitamins, trace minerals (e.g., Cu, Zn, Fe, Se), macro-minerals (e.g., Ca, P, Mg, K), coccidiostats (or anticoccidials, e.g., amprollium, decoquinate, lasalocid, monensin), hormones (e.g., growth hormones or hormones that inhibit estrus and/or ovulation). In general, low-inclusion ingredients may be in solid form or liquid form, depending on availability, cost, or other factors. Generally, it may be desirable to produce a feed ration with substantially uniform distribution of the low-inclusion ingredients across the ration so that each animal that feeds from the ration may consume a desired amount of the low-inclusion feed ingredients, rather than consuming too much or too little of the microingredients.

A feed ration can be produced that contains a particular combination of low-inclusion ingredients that, using the systems, apparatuses and methods disclosed herein, are distributed substantially uniformly throughout the feed ration. A "feed ration," as used herein, refers to the combination of one or more base animal feeds and a dry mixture composition containing one or more particular low-inclusion ingredients. A "base animal feed" as used herein generally refers to a feed that contains any of a number of by-products such as, but not limited to, barley, blood meal, bone meal, Brewer's grain, corn grain, corn gluten meal, corn gluten feed, cottonseed (e.g., whole or meal), distiller's grain, fish meal, hominy, feather meal, molasses, peanut skins, soybeans (e.g., whole or meal), tallow, or wheat (e.g., whole, bran or middlings). A feed ration as used herein can be formulated for cattle (e.g., dairy or beef), pigs, horses, sheep, chickens, or any other animal (e.g., a livestock animal), and, by selecting a particular combination of low-inclusion ingredients, can be customized for a specific population of animals. Example animal sub-populations can include male animals, female animals, pregnant females, juvenile animals, newly-arrived (e.g., stressed) animals, sick animals, combinations of the foregoing, or any other desired population or sub-population of animals.

Referring again to FIG. 1, a feed box 115, a micromachine 120, and a discharge conveyor 125 are shown. In an implementation, the feed box 115 may include a storage hopper, which may be used to hold high-moisture feed. The high-moisture feed may be dispensed, in an implementation, from the feed box 115 into the discharge conveyor 125. The micromachine 120 may include one or more bins or containers for holding microingredients, and may dispense microingredients in particular concentrations into the discharge conveyor 125. The discharge conveyor 125 may include a mixing section for mixing the one or more microingredients with the high-moisture feed, as will be described in more detail below. A control system (not shown in FIG. 1) may control the feed ration production process by controlling amounts of high-moisture feed and microingredients that are dispensed or metered into the discharge conveyor, and by controlling how the discharge conveyor mixes the feed and microingredients.

FIG. 1 also includes one or more base feed boxes 130, and a common conveyor 135. The one or more base feed boxes 130 may contain, without limitation, dry-rolled corn, high-moisture corn, or hay, to list just a few examples. The mixture of high-moisture feed and microingredients may be discharged from the discharge conveyor 125 to the common conveyor 135, according to an implementation. The common conveyor 135 may include a discharge screw to convey the mixture of high-moisture feed and microingredients away from the discharge conveyor 125, according to an implementation. Base feeds may be dispensed from the base feed boxes 130 into the common conveyor 135, where they may be mixed with the mixture of high-moisture feed and microingredients.

The common conveyor 135 may convey the entire mixture to a mixing wagon 140, according to an implementation. In some implementations, the mixing wagon 140 may include mixing machinery to further mix the mixture of one or more base feeds, high-moisture feed, and microingredients. The mixing wagon 140 may be a portable machine, and may deliver the feed batch to appropriate livestock pens 105 so that the animals therein may be fed. In an implementation, the mixing wagon 140 includes an auger 145 that can be used to dispense the feed ration from the mixing wagon 140 into the feed bunks 110 in the animal pens 105. Mixing wagons 140 can vary widely in complexity and size, and depending upon the implementation may be independently driven or may be pulled, as behind a tractor, for example.

Many alternatives to the system shown in FIG. 1 are possible. For example, in various implementations, the base feed boxes 130 are optional. That is, one, several, or all of the base feed boxes 130 may be omitted, and one or more base feeds may be delivered directly into the mixing wagon 140 or into the feed box 115, for example. In some implementations, the common conveyor 135 may also be omitted, and the discharge conveyor 125 may directly convey the mixture of high-moisture feed and microingredients (and possibly base feed) to the feed wagon 140 or to the feed bunks 110.

The systems, apparatuses and methods disclosed herein for making a feed ration may utilize a dry mixture composition to introduce and disperse the low-inclusion ingredients into a base animal feed, and may not require the use of any types of fluid carrier. As used herein, a "dry mixture composition" refers to one or more low-inclusion ingredients in combination with a dry carrier. A "dry carrier" as used herein refers to a composition that consists essentially of a high-moisture processed grain by-product. Such high-moisture processed grain by-products can result from the processing of a number of different grains such as corn, wheat, and milo. Examples of high-moisture processed grain by-products include, without limitation, gluten, non-grain feed ingredients, and wet distiller's grain. One example of a suitable high-moisture processed grain by-product is a commercial product marketed under the trade name Sweet Bran® (Cargill, Inc.; Minnetonka, Minn.).

In an implementation, the dry carrier may be stored in or loaded into the feed box 115. The dry carrier may be dispensed from the feed box 115 to the discharge conveyor 125, where it may be mixed with one or more microingredients dispensed from the micromachine 120 into the discharge conveyor 125. The mixing may occur in a mixing section of the discharge conveyor 125, as will be described more fully below. This mixing may occur without the use of fluid carrier, such as water or other liquid, or compressed air, microingredient delivery.

The use of a dry carrier that includes a high-moisture processed grain by-product, in combination with the systems, apparatuses and methods discussed herein, may allow for the low-inclusion ingredients to be mixed thoroughly and uniformly throughout the base animal feed. Also, the use of a dry carrier to introduce the low-inclusion ingredients as described herein may serve to maintain the substantially uniform distribution of the low-inclusion ingredients in the overall feed ration and prevent the low-inclusion ingredients from segregating or settling out.

Figure 2:
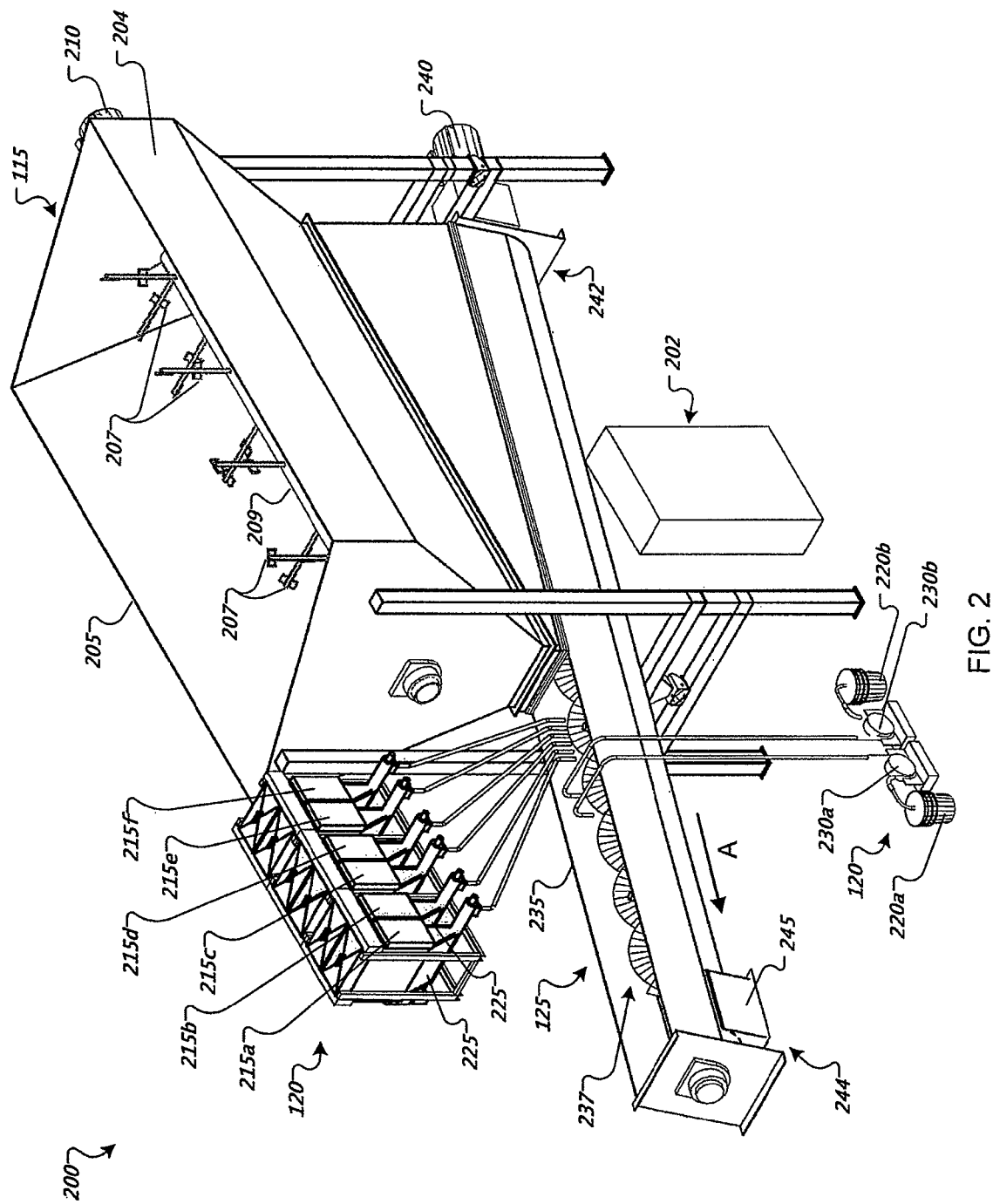
FIG. 2 is an elevation view of an exemplary system for mixing a livestock feed ration.

FIG. 2 is an isometric view of an exemplary system 200 for mixing a livestock feed ration. The system includes an exemplary feed box 115, such as a high-moisture feed box, a micromachine 120, and a discharge conveyor 125. In an implementation, a control system, illustratively represented in FIG. 2 by control cabinet 202, may control and manage the feed ration preparation by controlling the quantities of high-moisture feed and microingredients that are dispensed into the discharge conveyor 125, including controlling the rate and timing at which the microingredients are metered into the discharge conveyor 125 with respect to the timing, rate, and/or total weight of high-moisture feed that has been dispensed to the conveyor 125. The control system may also control aspects of the mixing of microingredients with feed. In an implementation, a user, such as a farmer, feedlot operator or feedlot nutritionist may determine an appropriate batch size based on the number of animals to be fed, and possibly other characteristics of the animals, such as size, health, etc. Given the batch size, the user may select an appropriate concentration of one or more microingredients to be included in the batch, and may enter the information into the control system, according to an implementation, as by typing it on a keyboard, using a pointing device to select entry information on a display, or entering the information on a touch screen, any or all of which may be housed within the control cabinet 202, in various implementations. In other implementations, an operator may enter batch input information on a handheld or portable device, such as a personal digital assistant (PDA), cell phone, laptop or notepad computer, or on a desktop computer located remotely from the control cabinet 202, and the information may be transmitted (e.g., wirelessly or over communication wires) to the control system.

According to an implementation, the feed box 115 may be an open-top sheet metal box for storing high-moisture feed to be used in an animal ration. The feed box 115 may include a storage hopper 204 to hold the high-moisture feed, and may include a lowered side 205, in an implementation, for ease of loading high-moisture feed into the hopper 204 using a loader or an auger, for example. The high-moisture feed box 115 may be of any appropriate shape, size, or capacity. In some implementations, the box 115 may be sized to hold enough high-moisture feed to make one, two, three, four, five, six or more feed batches. The feed box 115 may rest on a scale or load cell (not shown in FIG. 2) that may be used to weigh the contents of the feed box 115. This measurement may be used as an input to the control system, according to an implementation. In some implementations the load cell may be under the conveyor 125, and measurements may account for the weight of both the conveyor 125 and the feed box 115.

In some implementations, the feed box 115 may include a mass flow screw (not shown in FIG. 2) near the bottom of the hopper 204 to discharge high-moisture feed from the box 115 onto the discharge conveyor 125. Various types of discharge means may be used, including discharge screws with a center discharge or end discharge. In other implementations, the feed box does not include a mass flow screw, and a discharge screw 237 from the discharge conveyor 125 pulls high-moisture feed from the feed box 115. The feed box 115 may include one or more paddle mixers 207 attached to an agitator shaft 209 that can rotate within the box 115 to break up and de-clump the high-moisture feed contained therein, which can advantageously keep the mass flow screw or discharge screw appropriately supplied with high-moisture feed during the batch production process. A motor 210 may drive the agitator shaft 209 to cause the paddle mixers 207 to de-clump the high-moisture feed within the hopper 204 and help force the feed down to the discharge screw 237 of the discharge conveyor 125. In an implementation, the motor 210 may rotate the agitator shaft at a speed of 4-6 revolutions per minute (rpm), though any appropriate speed may be used, such as up to about 50 rpm.

In implementations where the feed box 115 includes a mass flow screw, the motor 210 may drive the screw and a reducer (not shown in FIG. 2) may be used to mechanically gear down the speed of the motor 210 to appropriately drive the agitator shaft 209. Any appropriate reduction ratio may be used. In implementations where the feed box 115 does not include a mass flow screw, the motor 210 may directly drive the agitator shaft 209. In yet other implementations, the agitator shaft 209 and paddle mixers 207 may be omitted, as may the motor 210. In some implementations, the high-moisture feed box 115 may be positioned under a shelter to protect the contents from rain, snow, or other environmental elements.

The micromachine 120 may deliver a ration-specific amount of one or more low-inclusion feed ingredients to the discharge conveyor 125. In an implementation, the one or more low-inclusion feed ingredients may be delivered to the discharge conveyor 125 as the high-moisture feed is dispensed from the feed box 115. In the exemplary implementation shown in FIG. 2, the micromachine 120 includes six dry storage bins 215 and two liquid storage containers 220 that may hold, respectively, solid or liquid microingredients. In other implementations, there may be any appropriate number (e.g., zero, one, two, three, four, five, six, seven, eight, etc.) of dry bins 215 and/or liquid containers 220 for storage of solid or liquid microingredients, and each batch may use microingredients from any or all of the bins 215 or containers 220, and in any desired combination.

The micromachine 120 may include, for each bin 215 or container 220, a scale or load cell for measuring a weight of contents (i.e., the microingredients) contained within the bin 215 or container 220. In an implementation, readings from the load cells may be transmitted to a controller (e.g., housed in control cabinet 202) for use in controlling the feed system 200. Given initial quantities of microingredients in each of the bins 215 or containers 220, and by tracking the weight of the microingredients remaining in the bin 215 or container 220 during batch processing, the control system may track an amount of microingredients that have been added to the ration, as well as an amount remaining in the storage bin 215 or container 220, according to an implementation. In similar fashion, the control system may track the contents of the feed box 115, and may use the collective measurements, combined with an input ration matrix of desired batch ingredients and quantities (e.g., as entered by an operator, such as a feedlot manager or nutritionist or employee), to administer the batch ration process.

The solid microingredients may be conveyed from the bins 215 to the discharge conveyor 125 by gravimetric feeders 225, according to an implementation. Alternatively, a vibrating or stationary metal sheet may convey the solid microingredients to the discharge conveyor 125, either individually or in aggregate. The liquid microingredients may be individually pumped into the discharge conveyor 125 by pumps 230a, 230b in this example. In another example, the liquid microingredients may be dispensed into a common liquid collection area (not shown in FIG. 2) and pumped to the discharge conveyor 125 by a single pump 230. Gravimetric feeds may alternatively be used if the containers 220 are positioned above the discharge container 125. While the micromachine 120 is shown in close proximity to discharge conveyor 125 in this example, in other implementations the micromachine 120 may be remotely located from the discharge conveyor 125, such as in a building or shelter, and the microingredients may be pumped over the intervening distance to the discharge conveyor 125, for example. Similarly, the liquid storage containers 220 and pumps 230 are shown displaced from the solid storage bins 215 in FIG. 2. In other implementations, the liquid storage containers 220 and pumps 230 could be positioned contiguous or in close proximity to the solid storage bins 215, for example. In alternative implementations, the micromachine may dispense the microingredients into the feed box 115.

The exemplary discharge conveyor 125 shown in FIG. 2 is inclined and includes a trough 235 that defines a channel that houses the discharge screw 237, which may longitudinally span the length of the discharge conveyor 125. The trough may be formed of carbon steel, stainless steel, galvanized steel or other alloys, for example, and may be generally "U"-shaped, flared, or tubular, according to an implementation. The discharge screw 237 may include a central shaft and flights connected to the shaft, such that when the shaft is rotated, the flights collect and transport material along the channel. For example, the rotating discharge screw can collect the high-moisture feed from the feed box 115 and the microingredients from the micromachine 120 and transport the feed and the microingredients through the channel in the trough 235, as illustratively indicated by directional arrow "A" in FIG. 2. The discharge screw 237 may include various flight types, such as helicoid flights, ribbon flights, paddle flights, cut flights and the like, and the flights may have constant pitch or variable pitch, depending upon the implementation. In some implementations, the discharge conveyor shaft may be tapered to suit a particular application, such as to uniformly pull material from the feed box 115.

A motor 240 located at a proximal end 242 of the discharge conveyor 125 may drive the discharge screw 237, causing it to rotate. In this fashion, the high-moisture feed and the microingredients may be conveyed through the discharge conveyor 125 to a discharge spout 245 near a distal end 244 of the discharge conveyor 125, where the mixture may exit the discharge conveyor 125. The mixture may exit the discharge spout 245 into the common conveyor 135 (see FIG. 1), according to an implementation. In other implementations, the mixture may be dispensed directly from the discharge spout 245 into the feed wagon 140 (FIG. 1), or directly to the feed pens 105, such as into one or more feed bunks 110. In an implementation, the motor 240 may drive the discharge screw 237 at a rate of about 65-75 rpm, though any appropriate rate may be used.

Figure 3:
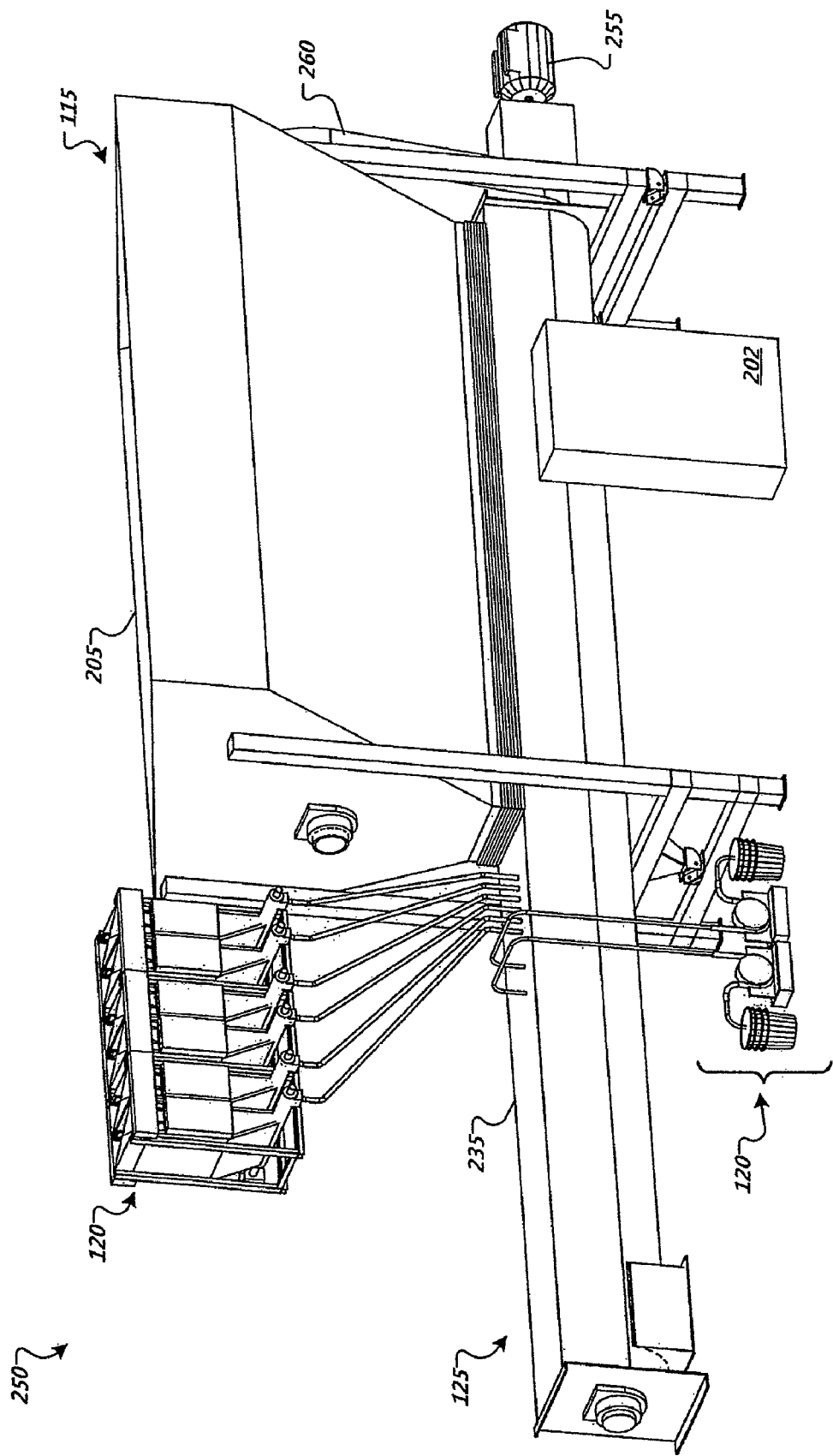
FIG. 3 is an isometric view of an exemplary system for mixing a livestock feed ration.

FIG. 3 is an isometric view of an exemplary system 250 for mixing a livestock feed ration. In this implementation, the discharge conveyor 125 is shown substantially flat (that is, not inclined). In other implementations, the discharge conveyor 125 may be positioned at an appropriate inclined angle. In some implementations, the trough 235 may include a cover or shroud (not shown in FIG. 3) to shield conveyor contents from the environment and for safety purposes. The system 250 includes a motor 255 to drive the discharge screw of the discharge conveyor 125, and a reducer 260 that couples the motor 255 to the agitator shaft of the feed box 115. The reducer may use one or more shafts, gears, belts, shims, pulleys, chains, etc., to provide an appropriate mechanical speed reduction for the agitator shaft. For simplicity, some support structures for the components described above are not shown in FIGS. 2-3. Similarly, interface connections and power connections are not shown for simplicity.

Figure 4:
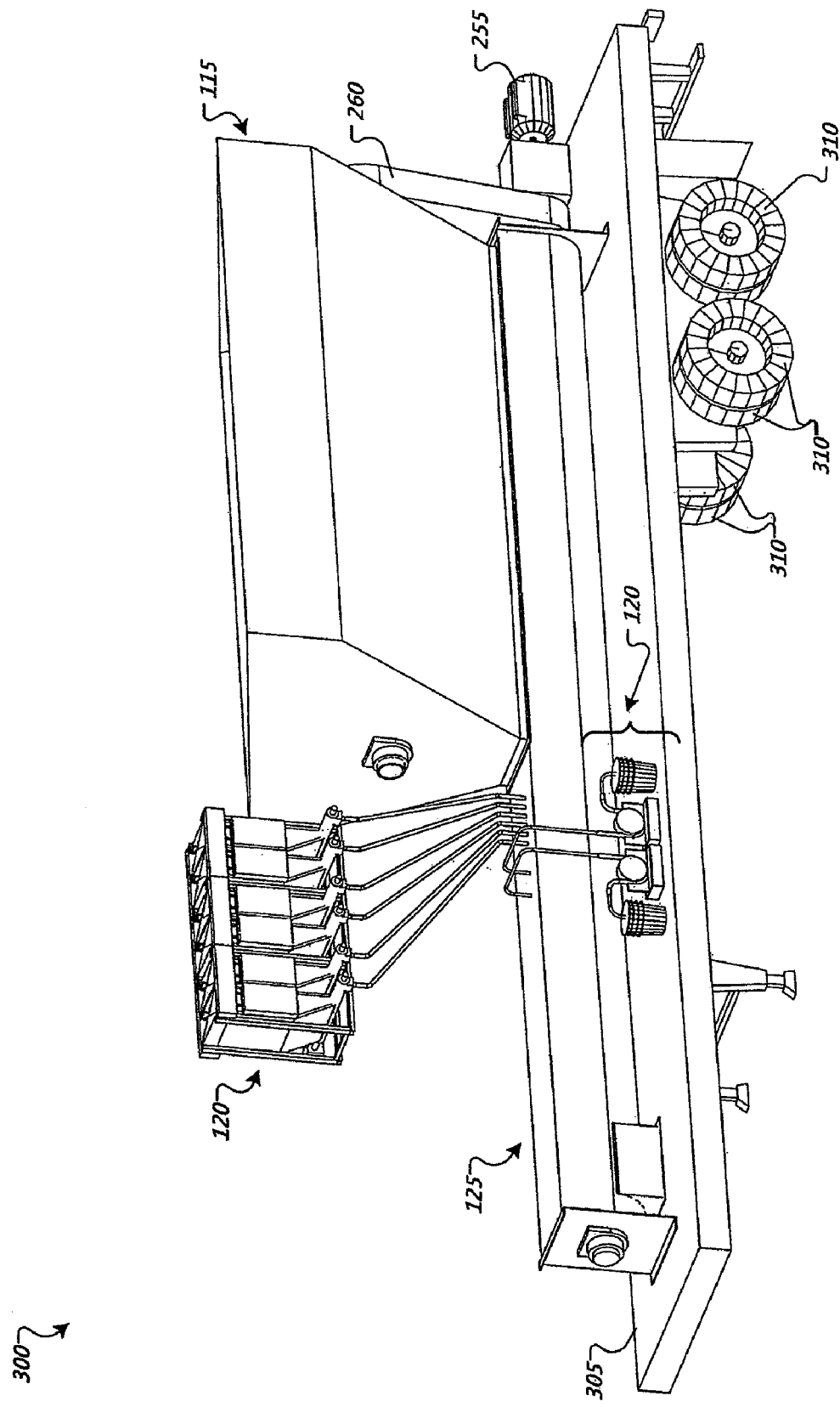
FIG. 4 is an isometric view of an exemplary portable system for mixing a livestock feed ration.

FIG. 4 shows an exemplary portable system 300 for mixing a livestock feed ration. The portable system 300 includes several of the same components as the systems 200, 250 shown in FIGS. 2-3, but here the discharge conveyor 125, feed box 115 and micromachine 120 are mounted on a flatbed trailer 305 in FIG. 4 (the control system is not shown for simplicity, but could also be mounted on the trailer 305). The flatbed trailer 305 includes wheels 310 so that the portable system 300 it may be conveniently mobile, as will be described in more detail below. In some implementations, the portable system 300 may be a skid-mounted modular unit. As shown in FIG. 4, the discharge conveyor 125 in this example is mounted substantially flat to the flatbed trailer 305, such that there is a small or negligible angle of inclination defined between the discharge conveyor 125 and the trailer 305. In an alternative implementation, the discharge conveyor 125 can be mounted to the trailer 305 via supports sized to provide an appropriate angle of inclination between the discharge conveyor 125 and the trailer 305. In yet other implementations, an angle of inclination between the discharge conveyor 125 and the trailer 305 may be adjustable, such as by including one or more adjustable supports or lifts to position the discharge conveyor 125 at an appropriate angle of inclination. In this fashion, for example, the discharge conveyor 125 may be lowered to a substantially flat position (such as the position shown in FIG. 4) for transport, which may facilitate compliance with vehicle height restrictions, and may be raised to an appropriate inclination angle when the system 300 is deployed at a feed site. As such, flexibility and applicability of the system may be enhanced. For simplicity, some support structures, such as a support structure to support the micromachine 120, are omitted for clarity in FIG. 4.

The flatbed trailer 305 may be pulled, for example, by a truck, tractor, or other appropriate vehicle, which may permit the portable system 300 to conveniently service one or more farms or feed lots, for example, or may permit easier servicing of multiple pens or sub-lots within a large feedlot. In this manner, cost savings may be realized as one or more dedicated, permanent installations may be replaced by the portable system 300. While this may result in cost savings for large farms or feedlots, smaller operators may also benefit. For example, in an implementation the portable system 300 may be rented or borrowed, which may permit operators to avoid larger up-front fixed installation charges in favor of smaller periodic charges, while maintaining the advantages provided by the flexibility of a system that permits uniform mixing of ingredients without the use of a fluid carrier.

In some implementations, the portable system 300 may be transported over roads, highways, and interstate highways, for example, and may be sized in accordance with overhead pass, traffic light, or other height restrictions, and road, bridge or other weight restrictions. In other implementations, the system may include a low-boy trailer, and the feed box 115, micromachine 120, discharge conveyor 125 and control system may be mounted to the low-boy trailer for portable transport.

Figure 5:
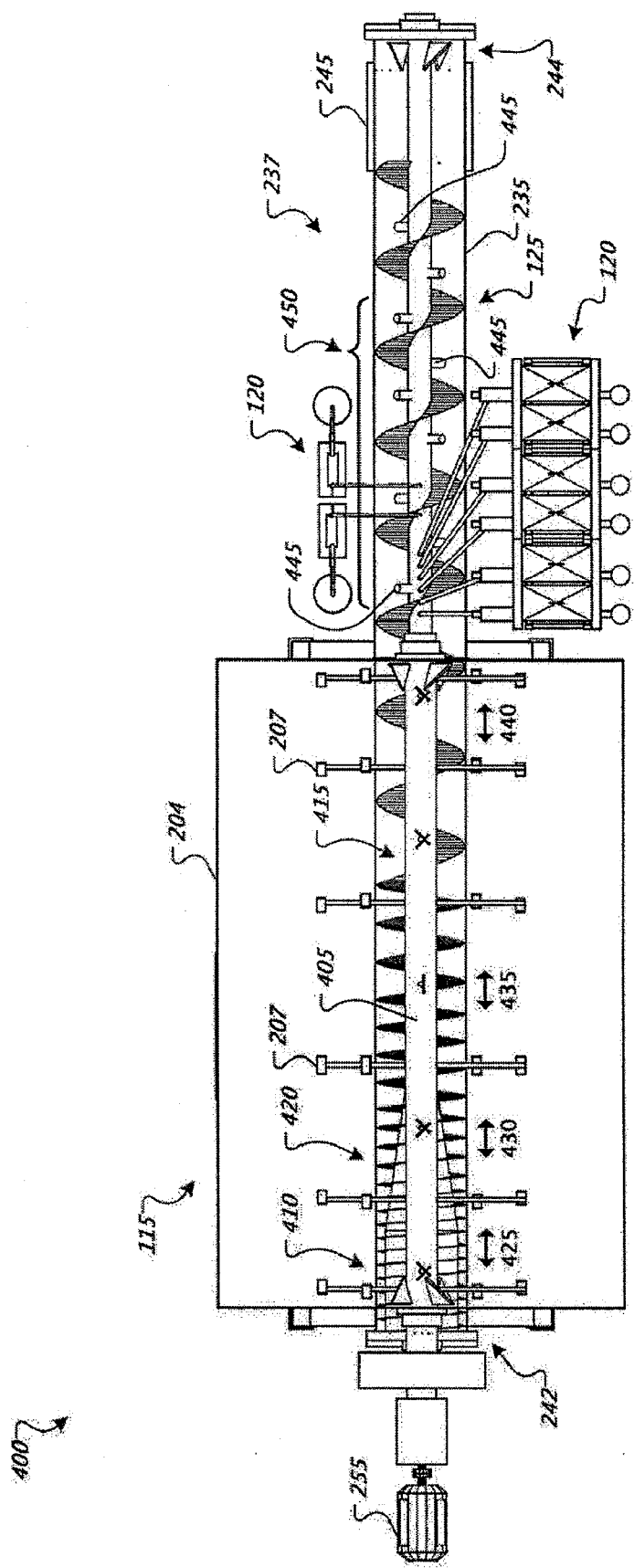
FIG. 5 is a plan view of an exemplary system for mixing a livestock feed ration.

FIG. 5 is a plan view of an exemplary system for mixing a livestock feed ration. In this implementation, the discharge conveyor 125 includes a discharge screw 237 with a tapered shaft 405. The tapered shaft 405 runs below the hopper 204 of the feed box 115, and can be used to draw material, such as high-moisture feed, approximately equally over the length of the feed box 115, according to an implementation. The tapered shaft 405, in this example, has a first section 410 of wider shaft diameter near the proximal end 242 of the discharge conveyor 125, a second section 415 of smaller shaft diameter that extends from the distal end 244 of the discharge conveyor 125 to a third, tapered section 420 between the first section 410 and the second section 415. The shaft diameter within the third section 420 tapers from the wider shaft diameter of the first section 410 to the smaller shaft diameter of the second section 415.

As shown in FIG. 5, the discharge screw 237 in this example includes varying flight pitch (that is, varying distance between the flights of the screw). For example, the flights in the first section 410 have first small pitch 425, and the flights in section 420 have a somewhat larger pitch 430. Moving rightward in FIG. 5, the pitch of the screw flights continues to increase in section 415, where a third pitch 435, and a fourth pitch 440 are shown. The discharge screw 237 also includes mixing paddles 445 attached to the shaft 405 in a mixing section 450 of the discharge conveyor 125, where the high-moisture feed and microingredients may be mixed together. The mixing paddles 445 may, in conjunction with the flights of the screw 237, assist with mixing the high-moisture feed and the metered microingredients when the shaft 405 is rotated by the motor 255.

In another implementation, not shown in FIG. 5, the pitch of the discharge screw is varied in an alternative manner. Under storage hopper 204, the discharge screw has a first pitch such that the screw remains substantially full or flooded with high-moisture feed from the feed box 115 during operation. In an area of the screw between the storage hopper 204 and the mixing section 450, the pitch is increased such that the screw remains, in that area, less than flooded. For example, the screw may remain only about 50% flooded during operation in this area. The pitch of the screw is tightened in the mixing section 450 such that the screw is again substantially flooded or full over that portion during operation, and the pitch is increased again in a section of the screw between the mixing area 450 and the discharge spout 245 such that the screw is less than flooded in that area. This may provide better mixing of the high-moisture feed with the microingredients.

Figure 6:
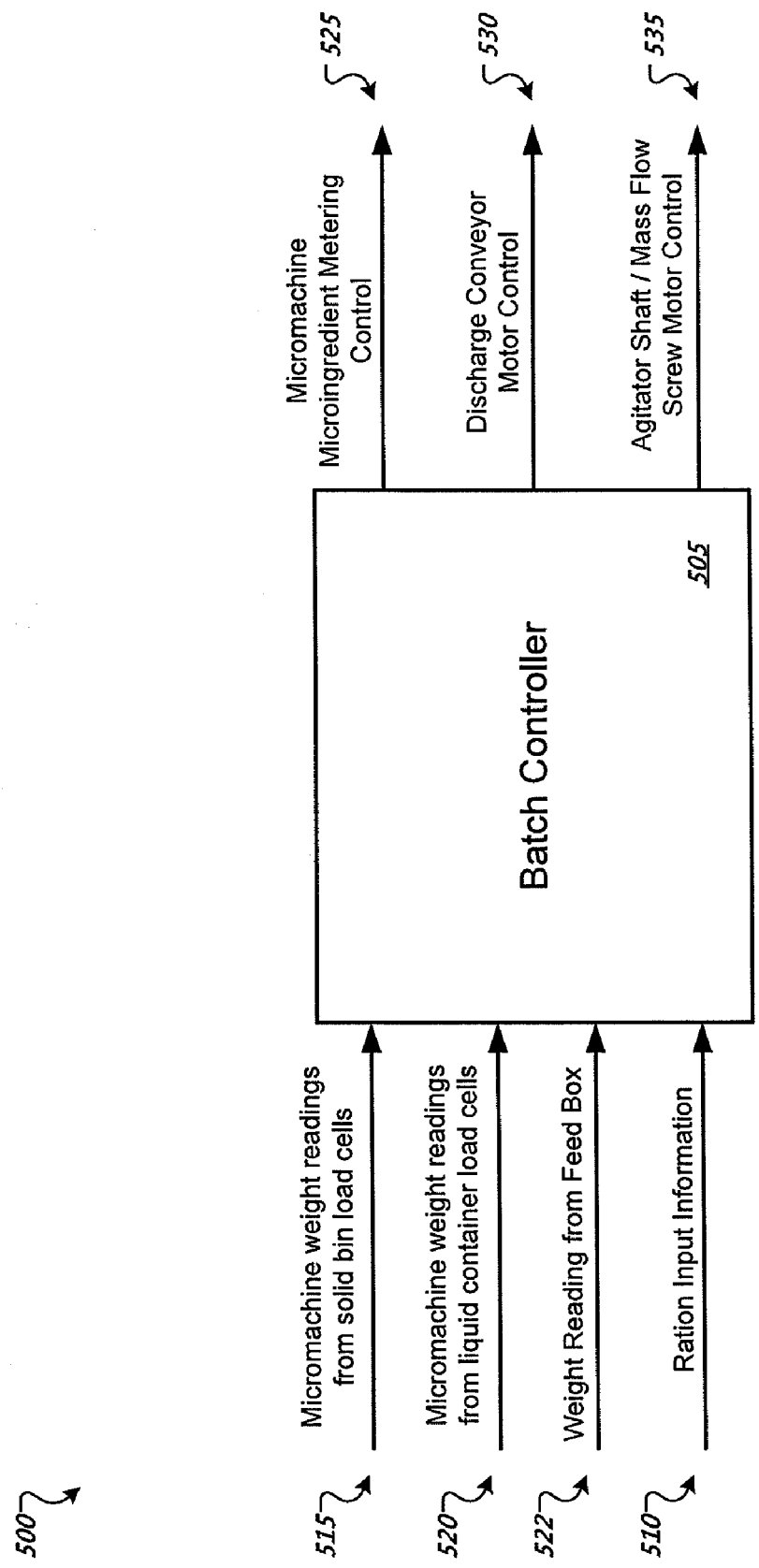
FIG. 6 is a block diagram of an exemplary control system that can be used to control a feed ration production process.

FIG. 6 is a block diagram of an exemplary control system 500 that can be used to control a feed ration production process. A batch controller 505, which may be housed in control cabinet 202, for example, may take as input ration information 510 that describes characteristics associated with a desired feed ration batch to be produced, and weight readings 515, 520 associated with each of the microingredient containers that hold the low-inclusion ingredients, and weight readings 522 associated with the high-moisture feed box 115. These input signals may be received in various ways, and may be received over wires or wirelessly. For example, each of the solid microingredient containers 215 and each of the liquid microingredient containers 220 may include a scale or load cell that can measure a weight of low-inclusion ingredients present in the particular container 215, 220 and provide readings 515, 520 as inputs to the batch controller 505. In an implementation, each load cell may communicate this information independently to the batch controller 505, and the batch controller 505 can track the information over time to determine, for each low-inclusion ingredient, how much of that low-inclusion ingredient has presently been added to the ration and how much should yet be added to the ration, based on the information received in the ration input information 510 and the information 522 from the feed box 115. Alternatively, the micromachine 120 may read the weight readings and transmit the readings 515, 520 to the batch controller 505.

In one example, a feedlot nutritionist may wish to create a feed batch for a population of juvenile cattle, where the batch includes 4000 pounds of high-moisture feed, 2 pounds of a first low-inclusion ingredient, and 1.5 pounds of a second low-inclusion ingredient. The nutritionist or another operator may enter this information into the batch controller 505 as the ration input information 510. Additionally, the nutritionist may further desire second, third, and fourth feed batches for healthy male cattle, pregnant female cattle, and sick male cattle, respectively. Each of the second, third and fourth batches may require different quantities and/or varieties of low-inclusion ingredients and/or high-moisture feed as compared to the first batch, in this example. The nutritionist or the operator may enter the information as ration input information 510.

In an implementation, the ration information 510 may be entered as a matrix of input information, where each row of the matrix may contain information corresponding to a particular batch to be produced, and each column of the matrix may contain a quantity of an ingredient, if applicable, to be included in that particular batch. The matrix may have a number of rows equal to a number of batches to be produced, and a number of columns equal to a number of available ingredients that may be used to produce livestock rations. For a given row (corresponding to a particular batch), some of the columns in the row may be empty, as the batch may not use some of the available ingredients, such as some of the available low-inclusion ingredients or base feeds, etc. In the example described above, the row of the ration matrix corresponding to the feed batch for the juvenile cattle may include "4000" in the column corresponding to high-moisture feed, "2" in the column corresponding to the first low-inclusion ingredient, and "1.5" in the column corresponding to the second low-inclusion ingredient, where "pounds" may be a default unit for the columns. Any appropriate unit may be used, such as tons, pounds, bushels, ounces, kilograms, grams, etc., and units may be varied for various columns. Depending on the implementation, other columns of the matrix may correspond to base feeds, for example.

In an implementation, the batch controller 505 may use the input information 510 to schedule the batch production. For example, the batch controller may determine appropriate control settings to be applied to components of the system to produce the desired feed ration. The batch controller 505 may process the inputs 510, 515, 520, and 522 and produce output signals to control the batch production process. For example, the batch controller 505 may produce one or more micromachine metering output signals 525 that, when received by the micromachine 120, indicate to the micromachine 120 how to appropriately dispense the relevant low-inclusion ingredients for a particular feed batch. In various implementations, this may include identification, timing and/or quantity information, which may cause the micromachine 120 to meter a precise amount of a particular low-inclusion ingredient over a specified time period, for example.

In an implementation, the batch controller 505 may direct the micromachine 120 to uniformly meter the microingredients to the discharge conveyor 125 over a large portion of the batch, rather than in one or more short bursts, which may enhance thorough batch mixing and provide better and more consistent mixing results. For example, the batch controller may control the micromachine 120 to dispense microingredients substantially uniformly over a period or window of the middle 70%, 75%, or 80% of the batch. That is, taking the 80% example, the batch controller 505 may first direct that 10% of the required high-moisture feed for the batch be dispensed from the feed box 115. Next, the one or more microingredients specified for the batch may be uniformly dispensed at appropriate rates while the next 80% of the high-moisture feed is dispensed from the feed box 115. The controller 505 may monitor the input signals to determine how much feed or low-inclusion ingredients have been dispensed, calculate how much remains to be dispensed and the rate at which it is being dispensed, and appropriately control the micromachine 120 to dispense the microingredients over the desired batch window, adjusting the metering rate if necessary. Next, the remaining 10% of the high-moisture feed may be dispensed from the feed box 115 and processed through the system, which may clean the discharge conveyor of microingredients associated with the present batch so that they do not remain in the system when future batches are produced. Other appropriate percentages and batch windows may be used, such as 15-70-15, or 10-75-15, 20-40-20, and the like.

The batch controller 505 may transmit control information to the micromachine 120 before, during, or after batch processing, depending on the implementation. In some implementations, the batch controller 505 may send control information to the micromachine 120 throughout the batch processing cycle, while in other implementations the controller 505 may provide the sufficient control information to control the micromachine 120 over the entirety of the process before the process begins. In these cases, for example, the micromachine 120 may store the control instructions in memory, for example, for present or future use. In some cases, the controller 505 may provide complete processing instructions before the process begins, but may supplement them with additional instructions if an unexpected occurrence transpires during the processing.

Similarly, the batch controller 505 may produce one or more motor control signals for controlling one or more motors used in the batch production process. The batch controller 505 may provide a control signal to the discharge conveyor motor (e.g., motor 240 in FIG. 2 or motor 255 in FIGS. 3-5), which may control the speed at which the discharge screw rotates. The batch controller 505 may similarly provide a control signal to one or more motors associated with the feed box 115, if applicable, such as a motor 210 in FIG. 2 that may rotate the agitator shaft 209 or a mass flow screw associated with the feed box 115. In other implementations, the batch controller may provide control signals for other aspects of the batch processing system. For example, slide gates (not shown) may be controlled, inclination angle of the discharge conveyor may be controlled, and alarms or warnings that indicate a problem with the system or that some action should be taken may be generated. In one example, the controller 505 may generate an indication that a microingredient container 215, 220 should be refilled, or that the feed box 115 or a base feed box 130 should be refilled.

In an implementation, the batch controller 505 may provide both coarse control and fine control of the components in the system. For example, during an early stage of the batch processing, the controller 505 may provide coarse control, and over a later stage of the batch processing the controller 505 may provide fine control. In some implementations, the user may define the batch processing to be controlled using a predetermined combination of coarse control and fine control, such that a uniform and accurate batch mixture may be produced.

The batch controller 505 may include a variety of hardware and/or software components. For example, the controller 505 may include one or more personal computers or servers, one or more programmable logic controllers (PLCs), one or more input/output (I/O) cards for interfacing with external system components, and MCC gear, according to an implementation. Non-volatile storage memory may provide storage for one or more application programs that can be used to implement the control of the batch production process as described herein. Magnetic, optical, or other appropriate storage technologies may be used, including one or more hard disk drives, flash memory, EPROM memory, EEPROM memory, and removable storage means, such as CD-ROMs, floppy disks, tapes, pen drive-type storage, and the like. As is conventional, the one or more application programs may be moved to faster random-access memory for active processing by a processor or controller, such as a general-purpose or dedicated microprocessor, microcontroller, or application-specific integrated circuit (ASIC) or field-programmable gate array (FPGA), for example. The components may include memory for storing instructions that when executed by a processor cause the components to perform actions for controlling a batch processing system. As described above, the batch controller 505 may include a receiver to receive wireless transmissions, and may similarly include a transmitter for making wireless transmissions. Any appropriate transmission technology or network may be used. Examples can include an Ethernet network (wired or wireless), bluetooth-enabled devices for wireless communication, and others. In some implementations, instructions or control information may be transmitted over the a local area network (LAN), wide area network (WAN), or the Internet, for example, or over a phone network, including using a cell phone or wireless PDA to transmit a ration input matrix or control information to the batch controller 505. For example, the controller 505 may receive the ration input information 510 via wireless transmission from a portable device, in an implementation, and may transmit messages to the portable device.

There are numerous advantages provided by the systems, methods, and apparatuses disclosed herein. For example, large expensive equipment may not be required to generate a feed ration. Also, use of a liquid carrier may not be required to introduce low-inclusion ingredients to a feed carrier. Further, because pre-made pellets also may not be required to produce a feed ration, expenses associated with the purchase, storage, and administration of pre-made pellets may be avoided. The low-inclusion ingredients may be maintained in substantially uniform distribution throughout the feed ration. In addition, there may be little to no difference in palatability between a feed ration made by the herein disclosed systems, apparatuses and methods and currently available feed rations because the ingredients are not significantly different, and feed rations made by the present systems, apparatuses and methods may cost the same or less than feed rations made using existing methods and equipment due, for example, to a reduction in storage and/or transportation costs that the present systems, apparatuses and methods utilize.

Although the herein disclosed systems, apparatuses and methods can be used by anyone in the commercial livestock industry, the herein disclosed systems, apparatuses and methods may allow a farmer, rancher or feed operator to be able to prepare, on demand, a particular feed ration to meet the needs of a particular population of animals. Smaller operators may benefit by the flexibility introduced by not having to purchase large, expensive permanent installations or purchase and store different pre-mixed combinations (e.g., pellets).

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A system for delivering one or more microingredient feed additives into a feed ration for animal consumption, the system comprising:
   a storage hopper for storing a high-moisture feed ingredient, the storage hopper including at least one mixer element attached to an agitator shaft, wherein the at least one mixer element is configured to agitate the high-moisture feed ingredient when the agitator shaft is rotated;
   a micromachine that includes a plurality of storage containers for storing a plurality of low-inclusion ingredients, the micromachine capable of metering and dispensing precise amounts of selected low-inclusion ingredients without using a fluid carrier; and
   a mixing conveyor that receives and mixes the high-moisture feed ingredient and the selected low-inclusion ingredients, the mixing conveyor including a discharge screw with a rotatable shaft and fighting attached to the shaft, wherein a portion of the fighting positioned below the storage hopper pulls the high-moisture feed ingredient from the storage hopper when the rotatable shaft is rotated and conveys the high-moisture feed ingredient along the mixing conveyor to a mixing section of the mixing conveyor that receives the selected low-inclusion ingredients dispensed from the micromachine without using a fluid carrier and mixes the selected low-inclusion ingredients with the high-moisture feed ingredient pulled from the storage hopper.

2. The system of claim 1, wherein the dispensing precise amounts of the selected low-inclusion ingredients does not use a liquid carrier.

3. The system of claim 1, wherein the dispensing precise amounts of the selected low-inclusion ingredients does not use compressed air carrier.

4. The system of claim 1, further comprising a portable transport platform, wherein each of the storage hopper, the micromachine, and the mixing conveyor are mounted to the portable transport platform.

5. The system of claim 4, wherein the portable transport platform includes one or more wheels.

6. The system of claim 4, wherein the portable transport platform is configured to be pulled by a tractor over a highway.

7. The system of claim 1, further comprising a batch controller that receives input information specifying the selected low-inclusion ingredients and corresponding quantities of the selected low-inclusion ingredients to be included in a feed batch to be produced, and generates first and second control signals, the first control signal for the micromachine to control the metering and dispensing of the precise amounts of the selected low-inclusion ingredients, and the second control signal for the mixing conveyor to control a speed of the rotatable shaft.

8. The system of claim 7, wherein the batch controller receives the input information wirelessly.

9. The system of claim 8, wherein the information is received from a personal digital assistant.

10. The system of claim 1, wherein the fighting is a helicoid.

11. The system of claim 1, further comprising a plurality of mixing paddles attached to the rotatable shaft in the mixing section of the mixing conveyor.

12. The system of claim 1, wherein the rotatable shaft includes a tapered section where a diameter of the shaft tapers from a larger first diameter to a smaller second diameter over the tapered section.

13. The system of claim 1, wherein a pitch of the fighting is varied along the mixing conveyor.

14. A portable system for delivering one or more micro ingredient feed additives into a feed ration for animal consumption, the system comprising:
   a storage hopper for storing a high-moisture feed ingredient, the storage hopper including at least one mixer element attached to an agitator shaft, wherein the at least one mixer element is configured to agitate the high-moisture feed ingredient when the agitator shaft is rotated;
   a micromachine that includes a plurality of storage containers for storing a plurality of low-inclusion ingredients, the micromachine capable of metering and dispensing precise amounts of selected low-inclusion ingredients without using a fluid carrier;
   a mixing conveyor that receives and mixes the high-moisture feed ingredient and the selected low-inclusion ingredients, the mixing conveyor including a discharge screw with a rotatable shaft and fighting attached to the shaft, wherein a portion of the fighting positioned below the storage hopper pulls the high-moisture feed ingredient from the storage hopper when the rotatable shaft is rotated and conveys the high-moisture feed ingredient along the mixing conveyor to a mixing section of the mixing conveyor that receives the selected low-inclusion ingredients dispensed from the micromachine without using a fluid carrier and mixes the selected low-inclusion ingredients with the high-moisture feed ingredient pulled from the storage hopper; and a portable transport platform configured to be pulled by a tractor over a highway, wherein each of the storage hopper, the micromachine, and the mixing conveyor are mounted to the portable transport platform.

15. The system of claim 14, wherein the dispensing precise amounts of the selected low-inclusion ingredients does not use a liquid carrier.

16. The system of claim 14, wherein the dispensing precise amounts of the selected low-inclusion ingredients does not use compressed air carrier.

17. The system of claim 14, further comprising a batch controller that receives input information specifying the selected low-inclusion ingredients and corresponding quantities of the selected low-inclusion ingredients to be included in a feed batch to be produced, and generates first and second control signals, the first control signal for the micromachine to control the metering and dispensing of the precise amounts of the selected low-inclusion ingredients, and the second control signal for the mixing conveyor to control a speed of the rotatable shaft.

18. The system of claim 17, wherein the batch controller receives the input information wirelessly.

19. The system of claim 14, further comprising a plurality of mixing paddles attached to the rotatable shaft in the mixing section of the mixing conveyor.

20. A system for delivering one or more microingredient feed additives into a feed ration for animal consumption, the system comprising:

a storage hopper for storing a high-moisture feed ingredient, the storage hopper including at least one mixer element attached to an agitator shaft that can rotate, wherein the at least one mixer element is confi cured to a agitate the high-moisture feed ingredient when the agitator shaft is rotated;

a micromachine that includes a plurality of storage containers for storing a plurality of low-inclusion ingredients, the micromachine capable of metering and dispensing precise amounts of selected low-inclusion ingredients without using a fluid carrier; and a mixing conveyor that receives and mixes the high-moisture feed ingredient and the selected low-inclusion ingredients, the mixing conveyor including a discharge screw with a rotatable shaft and fighting attached to the shaft configured to receive the high-moisture feed ingredient from the storage hopper and convey the high-moisture feed ingredient along the mixing conveyor to a mixing section of the mixing conveyor that receives the selected low-inclusion ingredients dispensed from the micromachine without using a fluid carrier and mixes the selected low-inclusion ingredients with the high-moisture feed ingredient pulled from the storage hopper.

* * * * *

UNITED STATES PATENT AND TRADEMARK OFFICE
CERTIFICATE OF CORRECTION

| | |
|---|---|
| PATENT NO. | : 8,152,358 B2 |
| APPLICATION NO. | : 12/313206 |
| DATED | : April 10, 2012 |
| INVENTOR(S) | : Chad Allen Conard et al. |

It is certified that error appears in the above-identified patent and that said Letters Patent is hereby corrected as shown below:

In column 5, line 26, delete "Minn.)." and insert -- MN). --, therefor.

In column 13, line 57, in claim 1, delete "fighting" and insert -- flighting --, therefor.

In column 13, line 58, in claim 1, delete "fighting" and insert -- flighting --, therefor.

In column 14, line 31, in claim 10, delete "fighting" and insert -- flighting --, therefor.

In column 14, line 40, in claim 13, delete "fighting" and insert -- flighting --, therefor.

In column 14, line 59, in claim 14, delete "fighting" and insert -- flighting --, therefor.

In column 14, line 60, in claim 14, delete "fighting" and insert -- flighting --, therefor.

In column 16, line 7, in claim 20, delete "confi cured" and insert -- configured --, therefor.

In column 16, line 18, in claim 20, delete "fighting" and insert -- flighting --, therefor.

Signed and Sealed this
Twenty-ninth Day of May, 2012

David J. Kappos
*Director of the United States Patent and Trademark Office*